United States Patent
Pirri et al.

(10) Patent No.: US 9,796,112 B2
(45) Date of Patent: Oct. 24, 2017

(54) TRUCK MIXER WITH SAFETY DEVICE

(71) Applicant: CIFA SPA, Senago (IT)

(72) Inventors: Nicola Pirri, Milan (IT); Emanuele Zorzi, Cesano Madrerno (IT); Federico Cheli, Milan (IT); Ferdinando Mapelli, Olginate (IT); Davide Tarsitano, Caronno Pertusella (IT)

(73) Assignee: CIFA SPA, Senago (IT)

( * ) Notice: Subject to any disclaimer, the term of this patent is extended or adjusted under 35 U.S.C. 154(b) by 381 days.

(21) Appl. No.: 14/408,820

(22) PCT Filed: Jun. 14, 2013

(86) PCT No.: PCT/IB2013/001241
§ 371 (c)(1),
(2) Date: Dec. 17, 2014

(87) PCT Pub. No.: WO2013/190354
PCT Pub. Date: Dec. 27, 2013

(65) Prior Publication Data
US 2015/0174788 A1 Jun. 25, 2015

(30) Foreign Application Priority Data
Jun. 20, 2012 (IT) .............................. MI2012A1087

(51) Int. Cl.
B28C 5/00 (2006.01)
B28C 5/42 (2006.01)
B01F 13/00 (2006.01)
B01F 13/04 (2006.01)
B60P 3/16 (2006.01)

(52) U.S. Cl.
CPC .......... *B28C 5/421* (2013.01); *B01F 13/0037* (2013.01); *B01F 13/045* (2013.01); *B60P 3/16* (2013.01); *B01F 2215/0047* (2013.01)

(58) Field of Classification Search
CPC ..... B28C 5/4206; B28C 5/421; B28C 5/4217; B01F 13/0037; B01F 13/045
See application file for complete search history.

(56) References Cited

FOREIGN PATENT DOCUMENTS

| CN | 202241601 | 5/2012 |
|---|---|---|
| DE | 3214405 | 10/1983 |
| DE | 102004038504 | 2/2006 |
| DE | 202009001416 | 7/2010 |
| IT | MI2012A000093 | 1/2012 |
| JP | 2003-226192 | 8/2003 |
| WO | WO 2012/042063 | 4/2012 |
| WO | WO 2013111002 | 8/2013 |

OTHER PUBLICATIONS

WO 2012042063 to Kroschel.*
Machine Translation of WO 2012042063 to Kroschel.*

* cited by examiner

*Primary Examiner* — Tony G Soohoo
*Assistant Examiner* — Anshu Bhatia
(74) *Attorney, Agent, or Firm* — Hamre, Schumann, Mueller & Larson, P.C.

(57) ABSTRACT

Truck mixer with safety device, comprising a drum rotatable around an axis of rotation by means of rotation devices, which comprise a first drive member of the electric type suitable to make said drum rotate, during normal use, and a second drive member that functions as a safety device, able to be selectively actuated in a condition of non-usability, even temporary, of said first drive member, and also suitable to make the drum rotate.

7 Claims, 3 Drawing Sheets

TRUCK MIXER WITH SAFETY DEVICE

FIELD OF THE INVENTION

The present invention concerns a truck mixer provided with devices to make the drum rotate in order to mix the concrete, and with safety devices which can be activated if the truck mixer suffers a mechanical failure.

BACKGROUND OF THE INVENTION

The use of truck mixers is known to transport concrete from a production plant to the construction site in which the concrete is used.

Both during the loading step in the production plant and also during the transport step toward the construction site, the concrete must be kept malleable, and therefore the rotating drum which contains the concrete must be kept in constant rotation so as not to cause the concrete to dry out and harden.

In known truck mixers, the rotation of the rotating drum normally occurs by means of a hydraulic engine, which is moved by a group of pumps commanded by a heat engine which is usually a diesel engine. The heat engine can be the same one that moves the vehicle or an auxiliary engine independent from that of the vehicle.

In the patent application IT-MI2012A000093, in the name of the present Applicants, a drum is described for a truck mixer driven by an electric drive member fed by electric accumulators.

The electric accumulators are charged by absorbing energy from the heat engine of the vehicle when it is driven, or by absorbing energy due to braking of the vehicle or again by means of connection to the electricity grid.

One disadvantage of this type of truck mixer is that, if the drive members of the drum suffer a mechanical failure, the drum cannot be kept in rotation if the breakdown is not fixed in a short time, and therefore the mix can solidify inside the drum.

In this eventuality, the drum of the truck mixer is damaged to the point of having to be replaced, which causes problems both from the point of view of maintenance and of replacement costs.

Some solutions to overcome this problem have been proposed in the state of the art.

DE 3214405 A1 shows for example a drive device to empty a mixing drum in emergency conditions, which provides the possibility of disconnecting the main hydraulic engine, if it breaks down, and of connecting a compressed air motor in its place. This document does not make reference to the use of electric motors and in any case provides the need to disconnect the non-functioning engine and to connect an emergency auxiliary motor in its stead.

Other documents which show the use of an electric motor to drive the drum are DE 20 2009 001416U1 and DE 10 2004 038504 A1.

One purpose of the present invention is to obtain a truck mixer of the type discussed above and equipped with a safety device which prevents damage to the drum in conditions of mechanical failure of the devices that make the drum rotate.

Another purpose of the present invention is to obtain a truck mixer equipped with a simple and economic safety device to be installed and activated in conditions of mechanical failure of the main engine of the truck mixer.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, a truck mixer with a safety device according to the present invention comprises at least a drum rotatable around an axis of rotation by means of rotation devices which allow to mix and possibly unload the cement mix which is contained inside the drum.

According to one feature of the present invention, the rotation devices comprise a first drive member of the electric type, suitable to make the drum rotate during normal use, and a second drive member, which acts as a safety device, able to be selectively actuated in a condition of non-usability, even temporary, of the first drive member, and also suitable to make the drum rotate.

In this way, at the moment when the first drive member, because of any possible damage thereto, even temporary, ceases to function, the second drive member is selectively activated to make the cement mix continue to be mixed, and thus prevents its solidifying in the drum and the possible unloading of the latter.

According to another feature of the present invention, the rotation devices also comprise a transmission member, such as for example a gear reducer, connected to the drum and to which both the first drive member and the second drive member are associated. A single transmission member can in this way define the direct connection to the drum both of the first and the second drive members, allowing, in case of need and if the first drive member does not function, the direct intervention of the second drive member, without further connection operations.

According to another feature of the present invention, selective connection means are provided to couple the transmission member to the second drive member only if needed, preventing the latter from being actuated also during normal use of the truck mixer. The possibilities of the second drive member being damaged and not guaranteeing its reliability when its activation is actually needed are thus reduced.

In accordance with one form of embodiment of the invention, the connection means comprise a clutch device and an actuation member provided to actuate the clutch device. The actuation member, whether it is the manual, electric, pneumatic or other type, allows the direct connection of the second drive member and of the transmission member only when needed by the operator because of particular requirements.

According to another feature of the invention, the second drive member is the electric type and electric feed devices are associated to it. This therefore allows to maintain the actuation of the drum completely independent from the heat engine of the vehicle of the truck mixer. In this way, it is possible to make the drum of the truck mixer rotate even when the heat engine of the vehicle is switched off. This allows to reduce atmospheric pollution and the fuel consumption of the vehicle itself.

According to another feature of the present invention, the electric feed devices are chosen from a group comprising at least one of either an electric accumulator and connection devices to the electricity grid. The electric accumulators can be either those already present on the vehicle to start the heat engine, or independent and dedicated electric accumulators, for example independent from those normally used for the feed of the first drive member.

According to a variant of the invention, the second drive member is the pneumatic type and means to feed a work fluid are associated to it.

In accordance with another feature of the invention, the feed means comprise at least one of either a compression system or a connection element for connection to an external compression system. Merely by way of example, the compression system can be the same that is usually present on board the vehicle or an external compression system.

BRIEF DESCRIPTION OF THE DRAWINGS

These and other characteristics of the present invention will become apparent from the following description of one form of embodiment, given as a non-restrictive example with reference to the attached drawings wherein.

Figure 1:
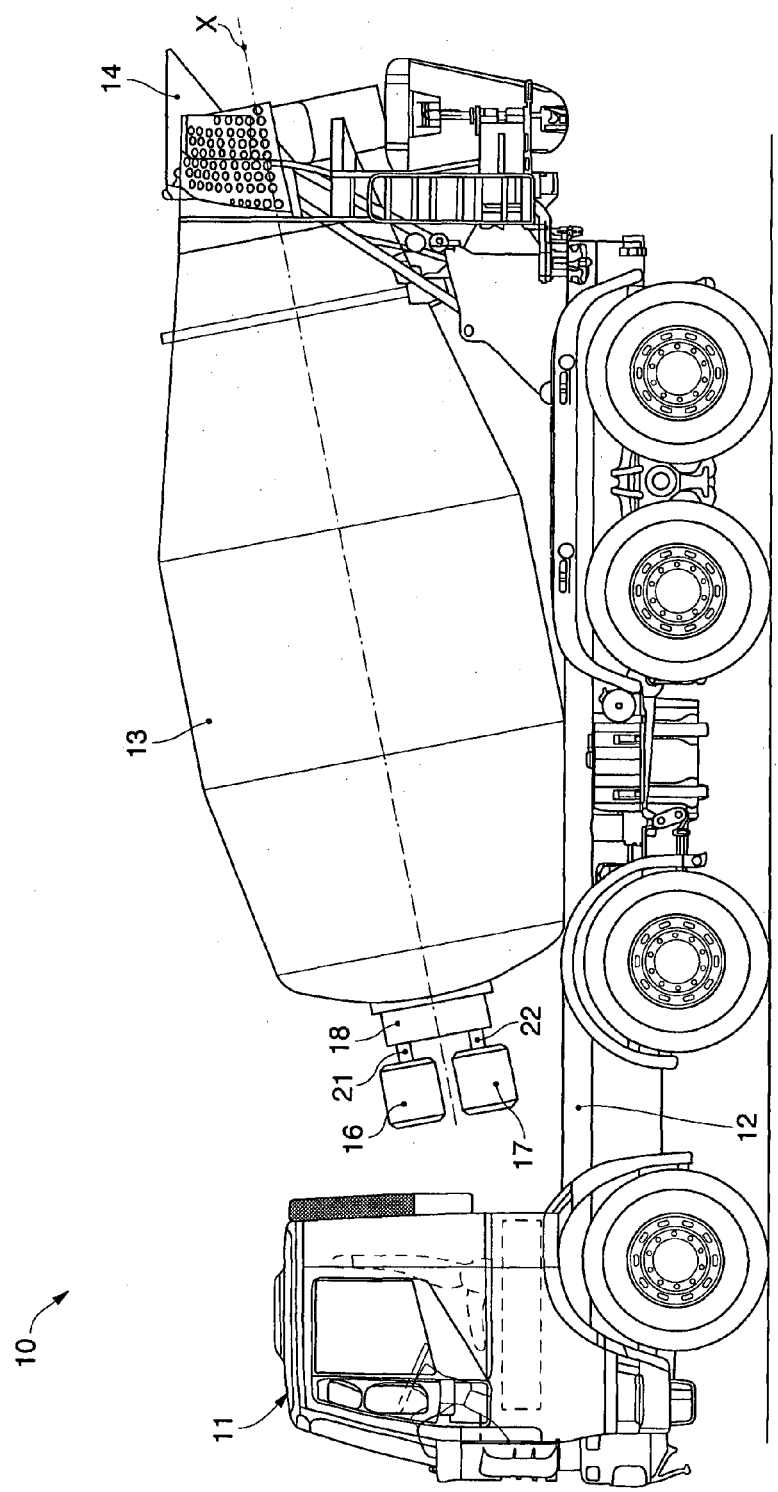
FIG. 1 is a lateral and schematic view of a truck mixer according to the present invention.

To facilitate comprehension, the same reference numbers have been used, where possible, to identify identical common elements in the drawings. It is understood that elements and characteristics of one form of embodiment can conveniently be incorporated into other forms of embodiment without further clarifications.

DESCRIPTION OF SOME FORMS OF EMBODIMENT

With reference to FIG. 1, a truck mixer 10 according to the present invention comprises a vehicle 11, for example a truck, of any known type, provided with a loading platform 12 on which a drum 13 is mounted rotating around an axis of rotation X.

Rotation devices 15 are associated at a first end to the drum 13, to make the drum 13 rotate around the axis of rotation X and, at a second end, an unloading hopper 14 is associated to allow the unloading of the cement mix possibly present inside the drum 13.

The rotation devices 15 comprise a first drive member 16, or main motor, and a second drive member 17, or auxiliary motor, which acts as a safety device in case the main motor 16 is damaged.

The auxiliary motor 17 can be driven only if, because of a mechanical failure, the main motor 16 does not work, in order to keep the cement mix present inside the drum 13 mixed, preventing it from solidifying. Moreover, the auxiliary motor 17 allows the possible unloading of the cement mix from the drum 13 through the unloading hopper 14.

The rotation devices 15 also comprise a transmission member 18, in this case a reducer, directly connected to the drum 13.

The main motor 16 and the auxiliary motor 17 are directly connected to the reducer 18 and provide, in the manner as will be indicated hereafter, to make the drum 13 rotate.

In particular, the reducer 18 is provided with two entrance shafts 21 and 22, to which the main motor 16 and the auxiliary motor 17 are respectively connected, and with an exit shaft 23 which is directly connected to the drum 13.

Between the entrance shafts 21, 22 and the exit shaft 23 of the reducer 18 suitable reduction means to reduce the number of revolutions can be provided, of the gear type, for example.

The main motor 16 is used, during normal use of the truck mixer, to make the drum 13 rotate, to mix and to allow the possible unloading operation of the cement mix contained inside the drum 13.

The main motor 16 is an electric motor, for example the three-phase type, and is fed by means of electric energy supplied by first electric feed devices 25.

The main motor 16, merely by way of example, has a nominal power comprised between 50 kW and 80 kW.

The first electric feed devices 25 comprise an electric accumulator 26, for example lithium batteries, and an electric converter 27 suitable to transform the continuous electric energy supplied by the electric accumulator 26 into alternate electric energy suitable to be supplied to the main motor 16 in order to activate it.

The electric accumulator 26 can be recharged, for example, according to one of the methods indicated in the above mentioned patent application IT-MI2012A000093, or by connection to the electricity grid, by converting the mechanical energy derivable from the drive shaft of the engine of the vehicle into electric energy, or by recovering the braking energy by using known devices such as KERS (Kinetic Energy Recovery System).

The auxiliary motor 17 is also the electric type, the three phase type for example, and can be selectively activated by the user if the main motor 16 suffers a mechanical failure.

In other forms of embodiment, the auxiliary motor 17 is the continuous current type.

Starting the auxiliary motor 17 allows to prevent the cement inside the drum 13 from solidifying when it is not possible to start the main motor 16, and therefore allows the drum to be possibly emptied.

Merely by way of example, the auxiliary motor 17 provides to make the drum 13 rotate at a minimum speed of about 1 rpm.

The auxiliary motor 17 is fed by second electric feed devices 30 which comprise at least one of either feeding by means of a dedicated electric accumulator 31, feeding by means of connection devices 32 to the electricity grid, feeding by means of an electric accumulator 33 also used to start the engine of the vehicle 11.

If the auxiliary motor 17 is fed by means of the electric accumulators 31, 33, electric converters 35 and respectively 36 are provided between the auxiliary motor 17 and the electric accumulators 31, 33 in order to convert the electric energy accumulated in the electric accumulators 31, 33 into alternate electric energy for the auxiliary motor 17.

Other forms of embodiment, which provide to use an auxiliary motor 17 with continuous current, it is not necessary to convert the electric current, which is an advantage in terms of reduction of bulk and simplification in plant design.

The electric accumulators 31 and 33 can be recharged, similarly to the electric accumulator 26, by connecting them to the electricity grid, by converting the mechanical energy derivable from the drive shaft of the engine of the vehicle into electric energy, or by recovering braking energy.

Between the reducer 18 and the auxiliary motor 17 selective connection means 38 are interposed to allow the connection of the entrance shaft 22 to the reducer 18.

The selective connection means 38 comprise, in this case, a clutch device 39 which can be selectively actuated by the operator by means of an actuation member 40, a lever for example.

In other forms of embodiment, the clutch 39 can be actuated by commands of the pneumatic type and by commands of the electric type.

In this way it is possible to de-couple the functioning of the auxiliary motor 17 from that of the main motor 16 and prevent any movement thereof also during normal use. This therefore limits the wear on the mechanical parts of the auxiliary motor 17 which could be damaged at the moment when its intervention could actually be required in the event of mechanical failure.

The main motor 16, the auxiliary motor 17, the first 25 and the second 30 electric feed devices are suitably controlled by a command and control unit 41 both to manage their actuation and also to control their functioning conditions.

If there is a mechanical failure of the main motor 16, the command and control unit 41 signals this condition to the user, so that the latter can intervene to prevent the solidification of any cement possibly inside the drum 13.

Figure 2:
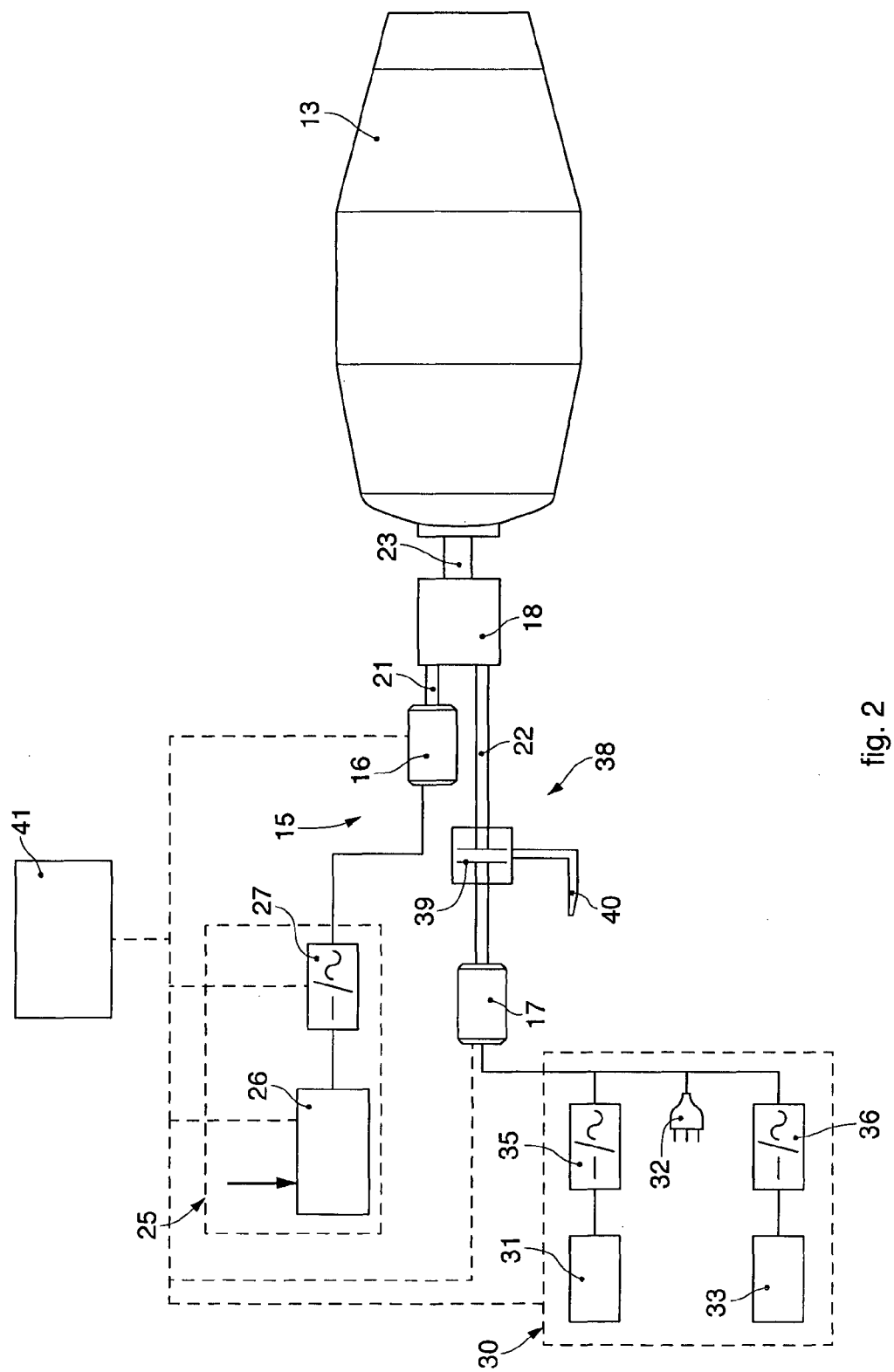
FIG. 2 is a schematic representation of the system that drives a drum of the truck mixer in FIG. 1.
Figure 3:
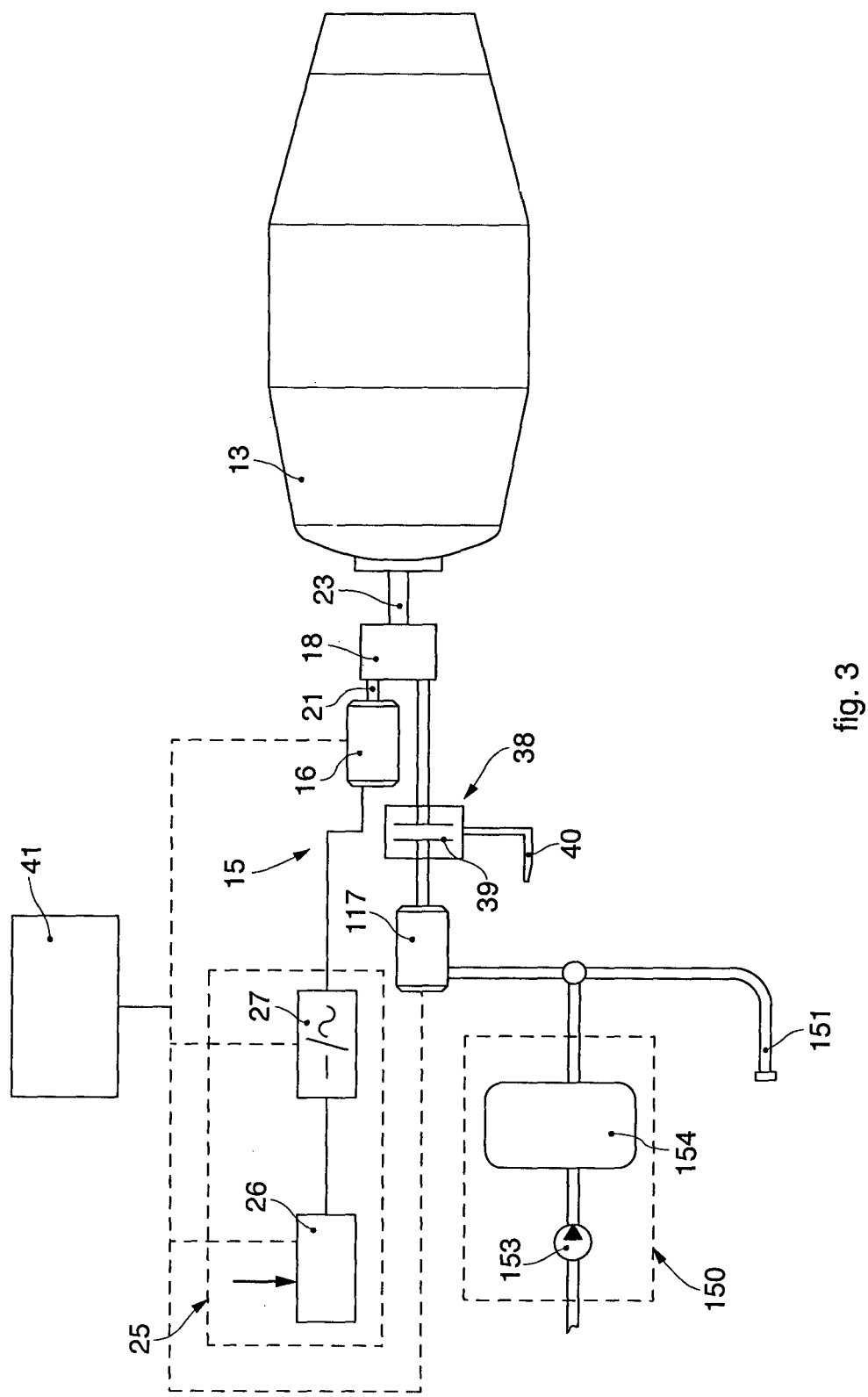
FIG. 3 is a representation of a variant of FIG. 2.

In accordance with another form of embodiment (FIG. 3), it can be provided that the auxiliary motor, instead of being the electric type as described with reference to FIGS. 1 and 2, is the pneumatic type; the auxiliary pneumatic motor is indicated by the reference number 117.

The auxiliary pneumatic motor 117 is activated by means of compressed air supplied by a compression system 150 provided on board the truck mixer 10 or alternatively by a connection tube 151 to which an external compression system can be selectively connected to the truck mixer 10.

The compression system 150 comprises at least one compressor 153 to compress the air inside a compression tank 154.

The tank 154 allows to supply a substantially constant flow of pressurized air to the pneumatic auxiliary motor 117.

Merely by way of example, the compression system 150 is the same pneumatic plant with which the truck mixer 10 is equipped for normal use.

In this case too, the pneumatic auxiliary motor 117 is associated to selective connection means 38 identical to those described above.

It is clear that modifications and/or additions of parts may be made to the truck mixer as described heretofore, without departing from the field and scope of the present invention.

It is also clear that, although the present invention has been described with reference to some specific examples, a person of skill in the art shall certainly be able to achieve many other equivalent forms of truck mixer, having the characteristics as set forth in the claims and hence all coming within the field of protection defined thereby.

The invention claimed is:

1. A truck mixer with safety device, comprising a vehicle and a drum mounted on said vehicle and rotatable around an axis of rotation, and also comprising a first drive member of an electric type connected to said drum by means of a transmission member to make said drum rotate, during normal use of said truck mixer, a first entrance shaft which connects said first drive member to said transmission member and an exit shaft which connects said transmission member to said drum, a second drive member that functions as a safety device, able to be selectively actuated in a condition of non-usability, even temporary, of said first drive member, said second drive member being connected to said transmission member by means of a second entrance shaft, a selective connection means being interposed between said transmission member and said second drive member, and wherein said second drive member is an electric type and at least one electric feed device is electrically connectable with said second drive member.

2. The truck mixer as in claim 1, wherein said selective connection means comprises a clutch device and an actuation member of said clutch device.

3. The truck mixer as in claim 2, wherein said actuation member is a mechanical, pneumatic or electric type.

4. The truck mixer as in claim 1, wherein said at least one electric feed device comprises an electric accumulator or a connection device to an electricity grid.

5. The truck mixer as in claim 4, wherein said at least one electric feed device comprises the electric accumulator, and further comprising an electric converter connected to the electric accumulator, the electric converter suitable to convert electric energy accumulated in said electric accumulator into alternate electric energy for said second drive member.

6. The truck mixer as in claim 4, wherein said at least one electric feed device comprises the electric accumulator, and wherein said electric accumulator is a rechargeable type using either connection to the electricity grid, conversion of mechanical energy by a drive shaft of said vehicle into electric energy, or recovery of braking energy of said vehicle.

7. The truck mixer as in claim 1, further comprising a command and control unit connected to said first drive member and to said second drive member, said command and control unit suitable to manage and control said first drive member and said second drive member.

* * * * *